United States Patent Office 3,131,473
Patented May 5, 1964

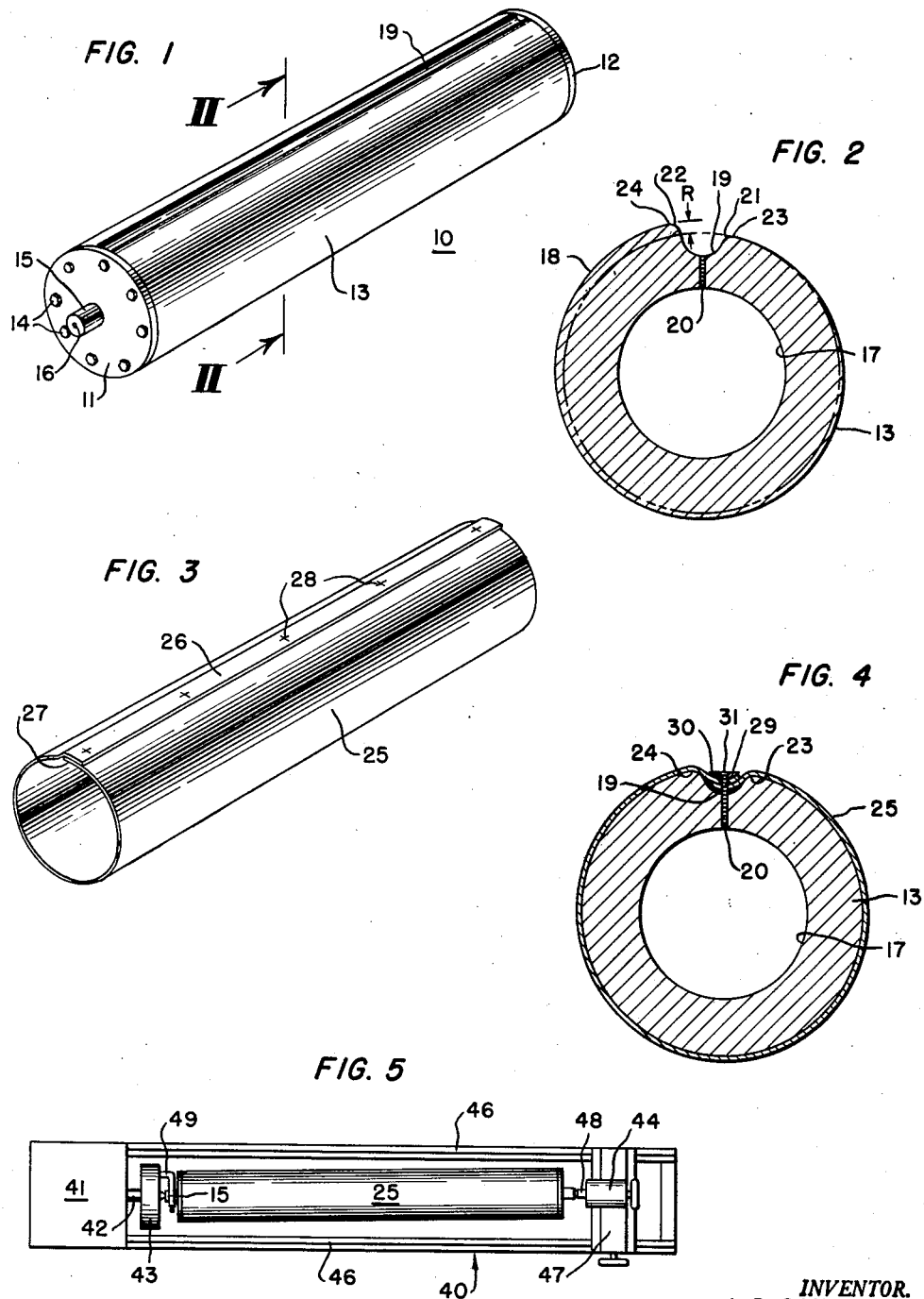

3,131,473
METHOD FOR PRODUCING TAPERED AND COMPOUND TAPERED ARTICLES
J P Sandlin, San Diego, Calif., assignor to General Dynamics Corporation (Convair Division), San Diego, Calif., a corporation of Delaware
Filed Dec. 31, 1959, Ser. No. 863,296
4 Claims. (Cl. 29—556)

The present invention relates to a method and apparatus for producing tapered and compound tapered articles and more particularly to a method and apparatus whereby the thickness of a workpiece may be accurately and simultaneously tapered in the width and length dimensions thereof.

In the construction of the wings of aircraft, particularly in the larger aircraft such as cargo and passenger transports, considerable weight saving is achieved by the use of tapered wing skins. Prior to the development of tapered skins, aircraft wings were constructed by joining sheets of aluminum together either by overlapping one upon the other or butting one with the other and using a splice plate across the butt joint. Since the load on the wing is not constant over its entire surface, the skins vary in thickness, being considerably thinner in areas of reduced stress. Each of the individual sheets were of a uniform thickness, requiring tapered shims under the thinner sheet in order to effect a smooth external contour where it abuts the thicker sheet. Upon the introduction of tapered skins, assembly and installation procedures become greatly simplified. Not only were tapered shims virtually eliminated, but since the wings additionally serve as fuel tanks, fuel tightness reliability at the skin splices improved considerably.

In the use of aluminum alloy material for tapered skins, the gauge of the material is usually of a sufficient thickness so as to favor fabrication by machining or rolling of flat stock material into a tapered sheet. However, due to the increased speeds of present day aircraft, other metals, such as stainless steel, are gradually being substituted for aluminum. Where stainless steel is involved, the gauge or thickness of the skins is much less, frequently .032 inch or less. Tapering of such thin skins presents manufacturing problems which were not apparent in the heavier aluminum skins. Thin skins tend to buckle or wrinkle more readily whereby the usual tapering methods have been found to be inefficient or unsatisfactory particularly where precise control of accuracy and contour smoothness are concerned. Moreover the old methods of tapering require large work areas in order to accommodate the machinery and skins in flat panel form.

The present invention contemplates the use of a novel form of mandrel with a nonuniform radius upon which the workpiece or skin is positioned and secured. The mandrel is then positioned on a lathe between the lathe centers and rotated. Tapering of the workpiece is automatically accomplished by directing a sanding belt or other metal removing tool or machine toward the mandrel into contact with the surface of the workpiece supported thereon. Compound tapering is achieved by offsetting the tailstock center of the lathe from its normal centered position. The belt sander supported on the lathe ways, automatically effects longitudinal tapering of the workpiece as a result of the angular disposition of the mandrel relative to the lathe ways.

An object of the present invention is to provide a method for progressively and accurately tapering thin gauge material.

Another object of this invention is the provision of a novel geometrical form of mandrel for supporting the sheet being tapered.

Still another object of this invention is to provide a method for tapering or compound tapering or exceptionally large workpieces.

A further object of this invention is to provide a method whereby the taper machined on a workpiece may be of an extremely gradual slope or incline.

Other objects and features of the present invention will be readily apparent to those skilled in the art from the following specification and appended drawings wherein is illustrated a preferred form of the invention, and in which:

FIGURE 1 is a perspective view of the eccentric mandrel of the present invention.

FIGURE 2 is an enlarged transverse sectional view taken on the line II—II of FIGURE 1.

FIGURE 3 is a perspective view of a formed and spot-welded workpiece as prepared before positioning on the mandrel of FIGURE 1.

FIGURE 4 is an enlarged transverse sectional view similar to FIGURE 2 showing the workpiece assembled on the mandrel, and FIGURE 5 is a plan view of the mandrel mounted between the centers of a lathe shown diagrammatically.

Referring now to FIGURES 1 and 2 of the drawings, a mandrel generally designated in its entirety by the numeral 10 comprises a pair of end plates 11 and 12 suitably secured to opposite ends of a substantially cylindrically-shaped mandrel 13 as by bolts 14. End plates 11 and 12 are preferably of an identical construction having an axially disposed shaft 15 projecting therefrom, the end of which is provided with a countersunk bore 16. If desired, end plate 12 may be a flat disc, in which case countersunk bore 16 would be formed directly into the face thereof. End plates 11 and 12 are preferably fabricated from a hard metal such as steel in order to reduce wear and damage, since it is contemplated that a single pair will suffice for use with any one of several mandrels 13 of various shapes and lengths.

Mandrel 13 may be cast or machined from any one of a wide variety of metals of which a soft metal such as aluminum alloy or magnesium alloy is preferred. Mandrel 13 is cored or bored at 17 to obtain lightening thereof in addition to providing means for proper and uniform cooling of the metal as required for casting manufacture. The outer circumference of mandrel 13, designated 18, is interrupted by a longitudinally extending recessed portion 19 having a series of threaded holes 20 in the bight portion thereof. Recess 19 is preferably blended into circumference 18 by radii 21 and 22 having their points of tangency 23 and 24 located on circumference 18. From tangency point 23, circumference 18 is formed into a spiral or helix configuration (as shown in exaggerated form in FIGURES 2 and 4) progressively increasing to its maximum radius at tangency point 24. The amount of the rise of the spiral or helix of circumference 18 as indicated by the dimension R in FIGURE 2 is commensurate with the amount of taper desired on the finished workpiece as will be hereinafter exemplified.

In preparation for the machining of a taper, a workpiece 25 as shown in FIGURES 3 and 4 is formed into a cylindrical shape by usual rolling methods. An end 26 thereof is lapped over opposite end 27 and thereafter suitably secured thereto as by a series of longitudinally spaced spotwelds 28. Workpiece 25 is telescoped into position over mandrel 13 with the lapped ends 26, 27 bridging recess 19 thereof. A retainer element 29 having a series of holes 30 adapted to align with threaded holes 20 of mandrel 13, is placed upon workpiece 25 in the area of recess 19. Using retainer element 29 as a template, holes are bored through workpiece 25. If desired, holes in workpiece 25 may be bored prior to assembly thereof on mandrel 13. Screws 31 are inserted through holes 30 and through the aligned drilled holes of workpiece 25 to engage threaded holes 20 of mandrel 13. Workpiece 25 is thereby drawn taut upon mandrel 12 by tightening screws 31 whereby lapped ends 26, 27 will be drawn into recess 19 thereof.

In machining a compound taper on workpiece 25, mandrel 13 together with workpiece 25 assembled thereon is rotatably mounted between centers of a conventional lathe 40 as shown in FIGURE 5. Lathe 40 comprises a power actuated gear box 41 from which a shaft 42 extends to support and drive a face plate 43. A tail stock 44 is longitudinally movable on the lathe ways 46 and transversely movable on its associated carriage 47 in a usual manner. Shaft 42 is provided with a usual live center (not shown) which projects into countersunk bore 16 of mandrel 13 and tail stock 44 supports a dead center 48 projecting into countersunk bore 16 at the opposite end of mandrel 13. A lathe dog 49 clamps about shaft 15 of mandrel 13 and engages with a slot in face plate 43 to effect a coupling.

As hereinbefore described, the circumference 18 of mandrel 13 is in the form of a spiral or helix. Since workpiece 25 is fitted with and drawn tightly against circumference 18, it will be apparent that workpiece 25 will assume an identical spiral configuration. The length of the spiral circumference 18 of mandrel 13 between tangency points 23 and 24 is developed to precisely correspond with the width desired of the finished workpiece 25, while the rise of the spiral precisely corresponds to the height of the wedge of material to be removed in the tapering operation. For example, assuming that it is desired to taper an .025 inch thick sheet of material from .025 inch to .015, the rise of the spiral of mandrel 13 would be calculated .025—.015=.010. If it is desired to machine a compound taper on workpiece 25, it is additionally necessary to offset tail stock 44 from its normal centered position to an off-center position precisely corresponding to the height of the material desired to be removed.

The machining of the taper may be accomplished by a usual tool bit and tool post (not shown) slideably mounted on lathe ways 46. However, it is preferred to use a belt sander in lieu of a tool bit since such machine provides a smooth finish in a minimum of time. The particular tool or machine employed for this operation is herein referred to by way of example only. It will be apparent that other machining devices such as grinders or electrolytic disintegration apparatuses may be substituted therefore without departing from the invention. Upon completion of the taper machining of workpiece 25, screws 31 are removed from mandrel 13, releasing retainer element 29 and workpiece 25. Tangency points 23, 24 are suitably marked or scribed on workpiece 25 whereupon the overlapped ends 26, 27 may be trimmed off at the scribe marks subsequent to straightening as by reverse rolling.

I claim:
1. The method of forming a tapering thickness on a sheet-like workpiece of initially substantially uniform thickness comprising the steps of securing said workpiece around a cylindrically shaped mandrel which mandrel has a spiral cross-section whereby said sheet-like workpiece assumes the cylindrical shape of said spiral shaped cross-section of the mandrel and is contiguous thereto, and machining the outer spirally shaped surface of said cylindrically arranged workpiece into a circular outer configuration.

2. The method of forming a tapering thickness on a sheet-like workpiece of initially substantially uniform thickness in a manner that the greater thickness is at one edge and the lesser thickness is at the opposite edge, comprising the steps of placing said workpiece around a cylindrically shaped mandrel having a spiral cross-section whereby said sheet-like workpiece assumes the cylindrical shape of said spiral shaped cross-section of the mandrel and is contiguous thereto, securing said workpiece to said mandrel, and machining the outer spirally shaped surface of said cylindrically arranged workpiece into a circular outer configuration while said workpiece is around said mandrel.

3. The method of forming a compound tapering thickness on a sheet-like workpiece of initially substantially uniform thickness in a manner that the thickness decreases along the length and width of said workpiece, comprising the steps of wrapping said workpiece around a cylindrically shaped mandrel having a spiral cross-section whereby said sheet-like workpiece assumes the cylindrical shape of said spiral shaped cross-section of the mandrel and is contiguous thereto, securing said workpiece to said mandrel, machining the outer spirally shaped surface of said cylindrically arranged workpiece about the circumference thereof into a circular outer configuration, and uniformly increasing the depth of machining along the length of said workpiece.

4. The method of forming a compound tapering thickness on a sheet-like workpiece of initially substantially uniform thickness in a manner that the thickness decreases along the length and width of said workpiece, comprising the steps of wrapping said workpiece around a cylindrically shaped mandrel having a spiral cross-section whereby said sheet-like workpiece assumes the cylindrical shape of said spiral shaped cross-section of the mandrel and is contiguous thereto, securing said workpiece to said mandrel, mounting said mandrel between a pair of centers, offsetting one of said centers from its normal centered position, rotating said mandrel, and machining the outer spirally shaped surface of said cylindrically arranged workpiece about the circumference thereof into a circular outer configuration.

References Cited in the file of this patent

UNITED STATES PATENTS

| | | |
|---|---|---|
| 1,714,661 | Crawford et al. | May 28, 1929 |
| 1,818,085 | Nelson | Aug. 11, 1931 |
| 1,890,747 | Pillard | Dec. 13, 1932 |
| 1,907,897 | Swegles | May 9, 1933 |
| 2,120,782 | Henwood | June 14, 1938 |
| 2,177,104 | Gonser | Oct. 24, 1939 |
| 2,302,229 | Lampton | Nov. 17, 1942 |
| 2,387,138 | Fruth | Oct. 16, 1945 |
| 2,803,159 | Hohwart et al. | Aug. 20, 1957 |
| 2,913,859 | Koch | Nov. 24, 1959 |